United States Patent
Carollo et al.

(10) Patent No.: US 7,356,818 B2
(45) Date of Patent: Apr. 8, 2008

(54) VIRTUAL MACHINE COMMUNICATING TO EXTERNAL DEVICE WITHOUT GOING THROUGH OTHER VIRTUAL MACHINES BY USING A LIST OF IP ADDRESSES MANAGED ONLY BY A SINGLE VIRTUAL MACHINE MONITOR

(75) Inventors: Mary Ellen Carollo, Newark Valley, NY (US); Susan Marie Farrell, Binghamton, NY (US); Angelo Macchiano, Apalachin, NY (US); Dennis R. Musselwhite, Hallstead, PA (US); Richard P. Tarcza, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 10/602,368

(22) Filed: Jun. 24, 2003

(65) Prior Publication Data
US 2004/0267866 A1   Dec. 30, 2004

(51) Int. Cl.
*H04J 3/24* (2006.01)
*G06F 15/16* (2006.01)
(52) U.S. Cl. .................. 718/102; 709/217; 370/389
(58) Field of Classification Search .......... 709/250; 718/1, 100
See application file for complete search history.

(56) References Cited
U.S. PATENT DOCUMENTS
7,111,303 B2 *  9/2006 Macchiano et al. ......... 719/313
7,228,337 B1 *  6/2007 Bornstein et al. ........... 709/217
2003/0037178 A1 *  2/2003 Vessey et al. ............... 709/319

OTHER PUBLICATIONS

Virtualizing I/O Devices on VMware Workstation's Hosted Virtual Machine Monitor Jeremy Sugerman, Ganesh Venkitachalam and Beng-Hong Lim VMware, Inc.; Proceedings of the 2001 USENIX Annual Technical Conference; Jun. 25-30, 2001 Boston, Massachusetts, USA.*
z/VM V4.3.0 General Information, Section 4.1 Control Program (CP), IBM Library Server, pp. 1-2.
VMware Workstations User's Manual, Verison 3.0, 2001.

* cited by examiner

Primary Examiner—Meng-Al T. An
Assistant Examiner—MengYao Zhe
(74) Attorney, Agent, or Firm—Arthur J. Samodovitz

(57) ABSTRACT

A method for communicating from a first virtual machine, defined by a virtual machine operating system, to an external device via a local area network (LAN). The virtual machine operating system also defines other virtual machines and a base portion common to all of the virtual machines. The first virtual machine writes an IP datagram to an output buffer allocated to the first virtual machine. The IP datagram comprises data and a destination IP address associated with the external device. The program functions in the base portion read the IP datagram from the output buffer to determine the destination IP address and then copy the IP datagram from the output buffer into storage allocated to the common base portion whereby the IP datagram passes from the first virtual machine into the common base portion storage without passing through any other virtual machines. Then, the program functions request a tangible adapter card for the network to send the IP datagram to the IP destination address.

25 Claims, 6 Drawing Sheets

VIRTUAL MACHINE COMMUNICATING TO EXTERNAL DEVICE WITHOUT GOING THROUGH OTHER VIRTUAL MACHINES BY USING A LIST OF IP ADDRESSES MANAGED ONLY BY A SINGLE VIRTUAL MACHINE MONITOR

The invention relates generally to computer systems and deals more particularly with an improved technique for IP communications between a virtual machine and a tangible network.

A virtual machine operating system is well known today. It comprises a common base portion and separate user portions that all run on a physical computer. In an IBM VM/ESA operating system and subsequent IBM z/VM operating system, the common base portion is called the Control Program ("CP") and each user portion is called a virtual machine or guest. Each virtual machine is a logical partition of physical resources of the computer. A guest operating system runs on each virtual machine, and the virtual machine appears to the guest operating system as a real computer. Many applications can run on each guest operating system and its virtual machine. Applications running on different virtual machines can communicate with each other through the common base portion. The communication may be in the form of messages conveyed by a service such as IUCV, which is based on IBM proprietary protocols. The IUCV service allows an application in one virtual machine to receive data from a storage buffer belonging to another virtual machine. IUCV does not result from any specific hardware architecture, so both applications must be programmed to use IUCV protocol. The IUCV service is further described in the publication entitled "z/VM V4R3.0 CP Programming Services" (Document Number: SC24 6001-00) which is available from International Business Machines at PO Box 29570, IBM Publications, Raleigh, N.C. 276260570 or on the WWW at www.IBM.com/shop/publications/order.

It is also possible for a user application on a z/VM virtual machine to communicate with another application via a tangible LAN, using Internet Protocol. This other application can be running on the same or different z/VM base portion or running on another computer system with a different type of operating system altogether. To support this communication, a tangible network interface card ("NIC") is provided between the z/VM base portion and the tangible LAN. Previously known device driver software is provided to interface between the Z/VM base portion and a subset of I/O devices within the tangible NIC. The tangible NIC provides all functions required for establishing an IP connection, and transferring data over the IP connection, i.e. (a) configuring the network interface, (b) starting the network interface, (c) sending a datagram from the device driver to the network, (d) sending a datagram from the network to the device driver, and (e) stopping the network interface.

To make the interface available for data transfer, the guest operating system (or the application) must instruct the device driver to configure and start the network interface for a specific, tangible NIC. When the application has data to send to an IP destination that is accessible via this network interface, it provides a datagram to the device driver. The datagram is a TCP/IP request or response, which includes application data and an IP destination address to identify the intended target on the network. The device driver inserts a device-specific header before the datagram to describe the IP destination address and any options relevant to the device. For example, one field in the header may indicate whether this is a unicast, multicast, or broadcast datagram. The device driver also notifies the NIC where the datagram is located in storage. When the tangible NIC is an OSA Express ("OSA-E") adapter in Queued Direct Input/Output (QDIO) mode, the device driver follows the rules of QDIO architecture to interact with the tangible NIC. According to QDIO architecture, the device driver stores the datagram in an output buffer, updates the state of the output buffer, and executes an instruction to signal the tangible NIC that data is ready to send to the network. The tangible NIC retrieves the datagrams from storage and obtains the IP destination address from the header. Next, the tangible NIC uses an internal cache table to correlate the IP destination address from the header with a Media Access Control ("MAC") address which identifies a destination on the tangible LAN. A cache table is maintained by each tangible NIC to record IP and MAC address associations detected on the tangible LAN (when furnished by other devices). Then, the tangible NIC sends the datagram on the tangible LAN to the destination, tangible NIC (or to multiple destinations in the case of a multicast or broadcast datagram). The datagram arrives at the destination, tangible NIC, where it is installed in storage owned by the target virtual machine. When the tangible NIC is an OSA Express in QDIO mode, the destination NIC installs the datagram in an input buffer, updates the state of the input buffer, and (if necessary) generates a I/O Interruption to signal the device driver that data is ready to send to the application. The destination device driver strips the device-specific header from the data and delivers the datagram to the target application.

U.S. Patent Application entitled "Virtual Machine Operating System LAN" filed Jul. 16, 2002 by Macchiano et al., serial 10/197,306 discloses prior art, virtual NICs for communication between different virtual machines having the same common base portion. These virtual NICs were part of IBM z/VM V4R3 operating system. Each virtual machine includes a device driver for the respective virtual NIC. The common base portion maintains a table of IP addresses by which each device driver addresses its respective virtual NIC and other, corresponding addresses by which the base portion addresses each virtual NIC. Each device driver is programmed to receive an IP datagram from its application and pass it to the respective virtual NIC using IP. The datagram includes an IP address of the other virtual, destination NIC and an indication that the other application should receive the datagram. The base portion is programmed to determine the other address of the other virtual, destination NIC based on the table, and transfer the datagram to a storage location associated with the other virtual, destination NIC or the other device driver.

Tangible network switches are also known to interconnect devices to a tangible LAN. Such a switch provides the ability for "nodes" (Network Connection Points) to send data to and receive data from other nodes. An example of a "node" is a physical computer or a base portion of a virtual machine operating system. In existing virtual router solutions, there is a router between adjacent LAN segments. Each node on a physical LAN separated by a router is considered to be on a separate LAN segment.

Another virtual machine operating system is currently available from VMware, Inc. of Palo Alto, Calif., and runs on a personal computer ("PC"). This operating system also includes a common base portion and user portions. The VMware (TM of VMware, Inc.) operating system includes (virtual) device driver programs which are associated with respective applications. The device driver programs also simulate respective, virtual network adapters to communicate between different virtual machines in the same system (i.e. having the same base portion of the virtual machine operating system). Different virtual machines having the same base portion use IP to communicate with each other. The virtual network adapter performs the following functions: (a) receive data from a virtual machine device driver and pass it to another virtual network adapter, (b) receive data from another virtual network adapter and pass it to a virtual machine device driver, and (c) pass data from one virtual machine device driver to another virtual machine device driver. By using the virtual network adapter, the VMware operating system supports communication between virtual machines in the same PC. The VMware operating system also supports communication between a virtual machine and a tangible network using a tangible network adapter card on the PC. The VMware virtual adapter model only provides Layer two (i.e. Link Layer) support, and no IP Layer support. Also, each VMware adapter is defined as a fully simulated adapter in a simulated internal network within the PC, or mapped directly to a tangible adapter in a tangible external network. Any virtual machine using a simulated adapter is isolated from the tangible external network unless another virtual machine, having both types of adapters, acts as a router between the simulated network and the tangible external network.

A prior art IBM z/VM 4.3.0 virtual machine operating system allowed virtual connection of a user virtual machine to an external, tangible LAN. The common base portion included a virtual LAN which interfaced to device drivers of the user virtual machines. A communication support virtual machine executed a TCP/IP for z/VM V4R3 application, and was the interface between the virtual LAN and the external, tangible LAN. The TCP/IP application performed the functions of attachment, coupling and IP routing to the tangible LAN. This was accomplished by dedicating communication devices to the communication support virtual machine which performed control functions. All tangible LAN communications to and from the user virtual machines passed through this communication support virtual machine. While this technique for interconnection to the tangible LAN was effective, it was encumbered by the need for the communication support virtual machine which passed all LAN communications to and from other, user virtual machines.

An object of the present invention is to provide an improved technique for IP communication between a user virtual machine and a tangible LAN or other network.

SUMMARY OF THE INVENTION

The invention resides in a system, method and computer program product for communicating from a first virtual machine, defined by a virtual machine operating system, to an external device via a network. The virtual machine operating system also defines other virtual machines and a base portion common to all of the virtual machines. The first virtual machine writes an IP datagram to an output buffer allocated to the first virtual machine. The IP datagram comprises data and a destination IP address associated with the external device. The program functions in the base portion read the IP datagram from the output buffer to determine the destination IP address and then copy the IP datagram from the output buffer into storage allocated to the common base portion whereby the IP datagram passes from the first virtual machine into the common base portion storage without passing through any other virtual machines. Then, the program functions request a tangible adapter card for the network to send the IP datagram to the IP destination address.

According to features of the present invention, a virtual machine operating system provides communication between a user virtual machine and a tangible network using Internet Protocol (IP). The user virtual machine executes an application and includes a device driver for a virtual network interface card (NIC). A base operating system portion is shared by all user virtual machines and includes all the virtual NICs. The base portion maintains a table of IP addresses by which each device driver addresses its respective virtual NIC and other, corresponding addresses by which the base portion addresses the virtual NIC. The portion also includes a data and control connections to the tangible network adapter. The device driver is programmed to receive an IP datagram from an application running in the respective user virtual machine, and pass it to the virtual NIC, associated with the user virtual machine, using IP. The datagram includes an IP address of the target virtual NIC and an indication that the target application should receive the datagram. The base portion is programmed to determine the address of the target NIC based on the table and transfer the datagram to a storage location associated with the target virtual NIC. The base portion is programmed to determine if the target address resides externally to the local LAN boundary. In such a case, the base portion transfers the datagram to the storage location associated with the tangible network adapter to be sent out across the tangible LAN. The base program is also programmed to receive an IP datagram from the tangible network adapter, determine the address of the target virtual NIC based on the table, and then transfer the datagram to that target virtual NIC. A switch controller implemented in the base portion and in a virtual machine employs the control connections to the tangible adapter to configure and manage the adapter connection.

According to still another feature of the present invention, there is a method for communicating from a device on a network to a first virtual machine defined by a virtual machine operating system. The virtual machine operating system also defines other virtual machines and a base portion common to all of the virtual machines. The base portion is coupled to the network via a tangible adapter card. A program function within the base portion copies an IP datagram received from the device via the network and the tangible adapter card into an input buffer of the base portion. The IP datagram comprises data and a destination IP address of one of the virtual machines. Another program function within the base portion reads the IP datagram from the input buffer to determine the destination IP address. If the destination IP address is for the first virtual machine, the IP datagram from the input buffer of the base portion is copied to an input buffer allocated to the first virtual machine, whereby the IP datagram passes from storage of the common base portion to storage of the first virtual machine without passing through any other virtual machines.

DETAILED DESCRIPTION OF THE PREFERRED EMBODIMENTS

Figure 1:
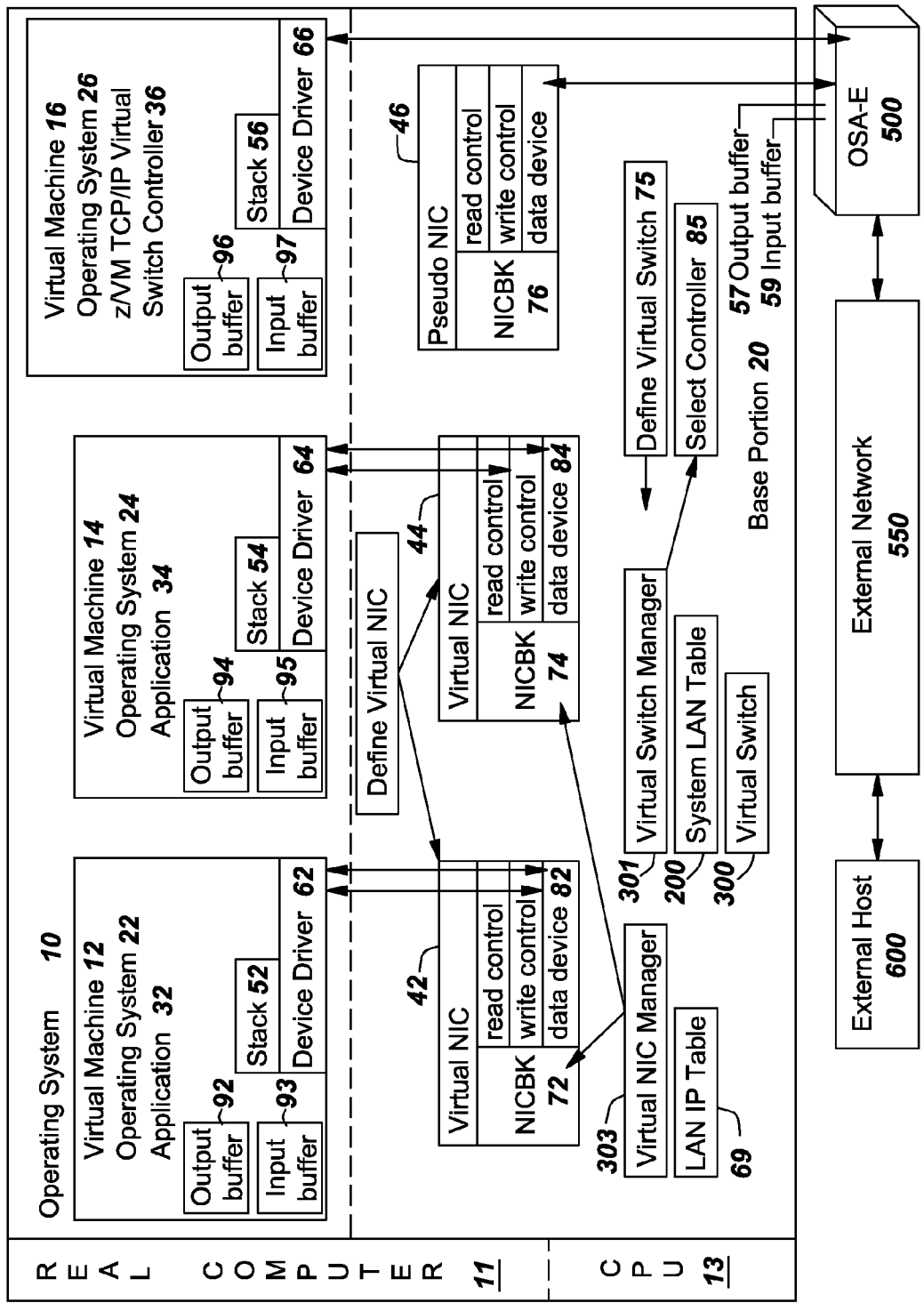
FIG. 1 is a block diagram of a virtual machine operating system including a virtual switch according to the present invention.

Referring now to the figures in detail, wherein like reference numbers indicate like elements throughout, FIG. 1 illustrates a virtual machine operating system generally designated 10 according to the present invention. By way of example, virtual machine operating system 10 can be an improved IBM z/VM V4R3 operating system although the present invention can be incorporated into other virtual machine operating systems as well. The details of the z/VM 4.3.0 operating system are disclosed in IBM publication z/VM 4.3.0 General Information (Document Number: GC24-5991) which is available from International Business Machines Corp. at PO Box 29570, IBM Publications, Raleigh, N.C. 276260570 or on the World Wide Web at www.IBM.com/shop/publications/order. This publication is hereby incorporated by reference as part of the present disclosure. Operating system 10 executes in a physical computer 11 (including a CPU 13) such as an IBM zSeries mainframe. However, the present invention can be incorporated into a virtual machine operating system executing on other server computers or personal computers as well. Operating system 10 comprises virtual machines 12, 14 and 16, and a common base portion 20 (also called "Control Program" or "CP" in the z/VM operating system). Virtual machines 12 and 14 are also called "user" virtual machines because of the nature of the applications they execute. Guest operating systems 22 and 24 execute in virtual machines 12 and 14. By way of example, operating systems 22 and 24 can be z/OS, z/VM, VSE or Linux (TM of Linus Torvalds), although other operating systems are feasible also. In the illustrated embodiment, application 26 executing in virtual machine 16 is TCP/IP for z/VM. Applications 32 and 34 execute in virtual machines 12 and 14 on operating systems 22 and 24, respectively. By way of example, applications 32 and 34 can be a web server, a mail server or a file server although other applications are feasible as well. In the illustrated embodiment, application 36 is an IBM z/VM TCP/IP virtual switch controller which is an improvement to a known TCP/IP for z/VM V4R3. Switch controller 36 provides support to a virtual switch manager 301 which supports IP communications between virtual machines 12 and 14 and any other applications running on tangible LAN 550. In order to send or receive an IP datagram, a source or destination virtual machine needs a program to convert between the format of an IP datagram and the format of the application running on the virtual machine. TCP/IP for z/VM V4R3 application, Linux operating system, IBM VSE operating system and IBM z/OS operating system are capable of this conversion. Although not shown, typically there are many other virtual machines and associated operating systems and applications which also share common base portion 20. Each guest operating system and virtual machine is capable of concurrently executing a number of different applications.

A virtual switch controller program 36 provides the following controller functions to a tangible OSA-E adapter card 500: initialization, defining IP addresses to the OSA-E adapter card, and multicast group registration. These functions are described in more detail below with reference to FIGS. 3 and 4. The OSA-E adapter card provides the following functions: address resolution protocol and ethernet frame encapsulation.

FIG. 1 also illustrates that virtual machines 12 and 14 include respective stacks 52 and 54. The stacks store and process outgoing messages yet to be sent out and incoming messages yet to be handled by the respective virtual machine. Stack 56 in virtual machine 16 can also perform these functions. The stacks are used as a staging ground for managing outgoing and incoming messages. Virtual machines 12, 14 and 16 also include respective device drivers 62, 64 and 66. Device drivers 62 and 64 interface to respective virtual NICs 42 and 44, and device driver 66 provides control only interfaces to tangible OSA-E adapter card 500.

The users of virtual machines 12 and 14 at configuration time issue DEFINE NIC commands to define their respective virtual NICs 42 and 44. Virtual NICs 42 and 44, together with a virtual switch 300, participate in IP communications. Each virtual NIC may include a group of virtual I/O devices/ program functions such as a read control device, a write control device and one or more data devices. The DEFINE NIC command includes operands to build a virtual NIC control block ("NICBK") 72 and 74 to represent their instance of the virtual NIC. The operands include a virtual device address for the first virtual device in the group to be created for the virtual NIC and the number of virtual devices to be created for the virtual NIC. The operands may also include the type of virtual NIC, such as HiperSockets or Queued Direct Input/Output ("QDIO"). A DEFINE NIC function 65 within the common base portion 20 receives the DEFINE NIC command (with the associated operands/ attributes). In response, the DEFINE NIC function allocates storage for the NICBK, and selects a unique Media Access Control identifier "MAC" for the NICBK and a series of unique virtual devices addresses or numbers for the I/O devices within the virtual NIC. Each I/O device in the virtual NIC has attributes including a virtual device address (to identify the device for I/O configuration), a virtual Subchannel ID (to identify the device for I/O instructions such as Start Subchannel (SSCH)), and a Channel Path ID or "CHPID" (to associate the device with a channel in the virtual machine I/O configuration). Next, the DEFINE NIC function writes the attributes of the virtual NIC into the NICBK and obtains from the base portion 20 a CHPID. In the general architecture of zSeries, the CHPID represents a slot in a top level of an I/O device hierarchy (channel, control unit, and device). In the illustrated embodiment, the device driver may use CHPID to recognize devices which belong to the same virtual NIC (to configure and initialize the interface) or the device driver may simply use the CHPID to recognize that the configured devices have the appropriate zSeries CHPID type. Thus, the CHPID number is used in the illustrated embodiment to simulate virtual NICs as if they were tangible zSeries I/O devices. The function of the read control device, write control device, and each data device is as follows:

Read Control device: One "read control" device or function is required for each interface group. During initialization/configuration of the interface, the device driver sends the read control device (via SSCH with a "Write" command) a request to designate this as a "read control" device for the interface, and includes a list of "data" devices to be used for this interface. From that point on, the "read control" device is used exclusively by the device driver to read any control messages generated by the virtual NIC (via SSCH with a "Read" command). For example, when the device driver sends a control message to register an IP address, the virtual NIC responds by generating a reply message indicating the results of that operation. In general, the virtual NIC will respond to each control message sent by the device driver with a reply message delivered to the "read control" device. The read control device includes a network interface device control block ("NIDBK") which contains an anchor for replies to control messages.

Write Control device: One "write control" device or function is required for each interface group. During initialization/configuration of the interface, the device driver sends this device (via SSCH with a "Write" command) a request to designate this as a "write control" device for the interface, and includes a list of "data" devices to be used for this interface. From that point on, the "write control" device is used exclusively by the device driver to write any control message to the virtual NIC for this interface. For example, the device driver sends a control message to the virtual NIC to register the use of a specific IP address. The virtual NIC responds with a control message delivered to the "read control" device. The write control device includes a network interface device control block ("NIDBK") which contains an anchor for control messages during initialization.

Data device: At least one "data" device or function is required for each interface group. During initialization of the interface, the device driver prepares a queue structure in storage owned by the virtual machine. This queue structure points to buffer areas also in storage owned by the virtual machine. An input queue defines buffers which are prepared to receive IP datagrams from the virtual NIC while an output queue defines buffers which are prepared to send IP datagrams to the virtual NIC. When these queues are prepared, the device driver sends the data device (via SSCH with an "Establish QDIO Queues" CCW command) a message that communicates the queue structure to the virtual NIC. Then the device driver sends this device (via SSCH with an "Activate QDIO Queues" command) a signal that authorizes the virtual NIC to operate on the established queues. IP datagrams are exchanged between the device driver and the virtual NIC by reading from, and writing into, the buffers associated with this queue structure. When data is being exchanged, the device driver signals the adapter card with an instruction to indicate there is data available on this device for the virtual NIC, and the virtual NIC indicates there is data available on this device for the device driver by I/O interruption. The data device includes a network interface device control block ("NIDBK") which contains an anchor for datagrams being delivered by the Virtual NIC Manager (303).

For each of the virtual I/O devices, the DEFINE NIC function:

Allocates storage for a "NICBK" control block which represents the I/O device for network functions. For example, the NICBK includes a pointer to the chain of datagrams enqueued for receipt via this I/O device on the virtual NIC.

Allocates a virtual device address in the range specified by the DEFINE NIC command. The virtual device address identifies the device for I/O device management. The virtual machine user enters CP commands such as DEFINE NIC to effect changes in the I/O configuration of the virtual machine. Virtual device addresses are used in this context to identify the device (or devices).

Allocates a subchannel ID in the virtual machine I/O configuration. The subchannel ID represents a slot in the lowest level of the I/O device hierarchy, and is required for proper simulation of zSeries I/O. The device driver uses the subchannel ID to identify a specific device (or a subchannel associated with a specific device) on the virtual NIC for zSeries I/O instructions such as SSCH (Start Subchannel).

Allocates storage for a "VDEV" control block which represents the state of the device for standard zSeries I/O functions such as start subchannel and halt subchannel. These standard I/O functions are used by the user portions 12 and 14 as part of the simulation of the virtual LAN as described below.

Finally, the DEFINE NIC function replies back to the command invoker (i.e. the virtual machine user who issued the DEFINE NIC command) that the virtual NIC has been defined.

The virtual machine user can issue a CP QUERY NIC command to learn the IP address (es) for each virtual NIC. This information is obtained by the base portion 20 by reference to the NICBK, associated NIDBKs, and LAN IP Table 69 entries and returned to the requesting virtual machine. The virtual NICs 42 and 44 are very similar to those described in U.S. Patent Application serial 10/197,306 filed Jul. 16, 2002 by Macchiano et al., which patent application is hereby incorporated by reference as part of the present disclosure.

To define virtual switch 300, a systems administrator issues a DEFINE VSWITCH command with operands to configure the virtual switch attributes. These operands include a name of the switch, and a device address of the tangible adapter card 500 the switch will use to connect to tangible LAN 550 or other tangible network. The DEFINE VSWITCH command may also include optional operands such as an alternate tangible adapter card, the portname of the adapter, the maximum limit of CP fixed storage that may be consumed and the name of virtual machine 16 which includes the TCP/IP virtual switch controller 36. (The system administrator may issue a CP QUERY CONTROLLER to learn which virtual machines are being used to control/manage the virtual switches.) Instead of creating the switch dynamically via the DEFINE VSWITCH command, the system administrator may elect to add a DEFINE VSWITCH statement to the SYSTEM CONFIG file so the virtual switch can be created during system IPL.

Figure 2:
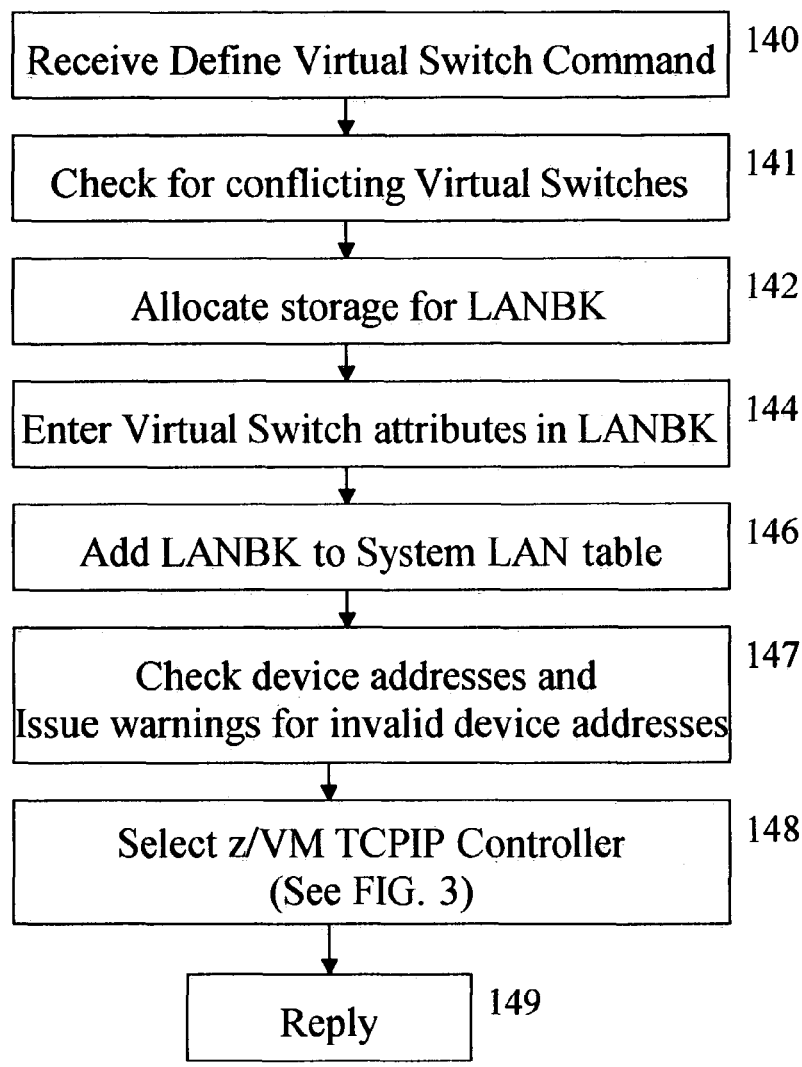
FIG. 2 is a flow chart illustrating a process implemented by the virtual machine operating system of FIG. 1 to define the virtual switch.

As illustrated in FIG. 2, a DEFINE VIRTUAL SWITCH function 75 within the base portion 20 receives a DEFINE VIRTUAL SWITCH command (with the associated operands/attributes) (step 140). In response, the DEFINE VIRTUAL SWITCH function checks all other LAN control blocks ("LANBKs") of other LAN segments, if any, for a conflicting LAN name and owner (step 141). Assuming there are no conflicts, the DEFINE VIRTUAL SWITCH function allocates storage for a LANBK for a new virtual switch 300 (step 142). Next, the DEFINE VIRTUAL SWITCH function builds a LANBK that includes the respective operands/attributes and will represent this virtual switch 300 (step 144). Next, the DEFINE VIRTUAL SWITCH function adds the LANBK to a System LAN Table 200 in base portion 20 along with the other LANBKs of other LAN segments, if any, (step 146). Next, the DEFINE VIRTUAL SWITCH function checks the device addresses specified on the command to ensure that they are valid, and if not, issues warnings (step 147). Next, the DEFINE VIRTUAL SWITCH function selects a z/VM TCP/IP virtual switch controller 36 to manage the connection to the tangible LAN adapter card 500 (step 148). Finally, the DEFINE VIRTUAL SWITCH function replies to the invoker (i.e. the user or administrator who issued the DEFINE VIRTUAL SWITCH command) that the virtual switch 300 has been defined (step 149).

Figure 3:
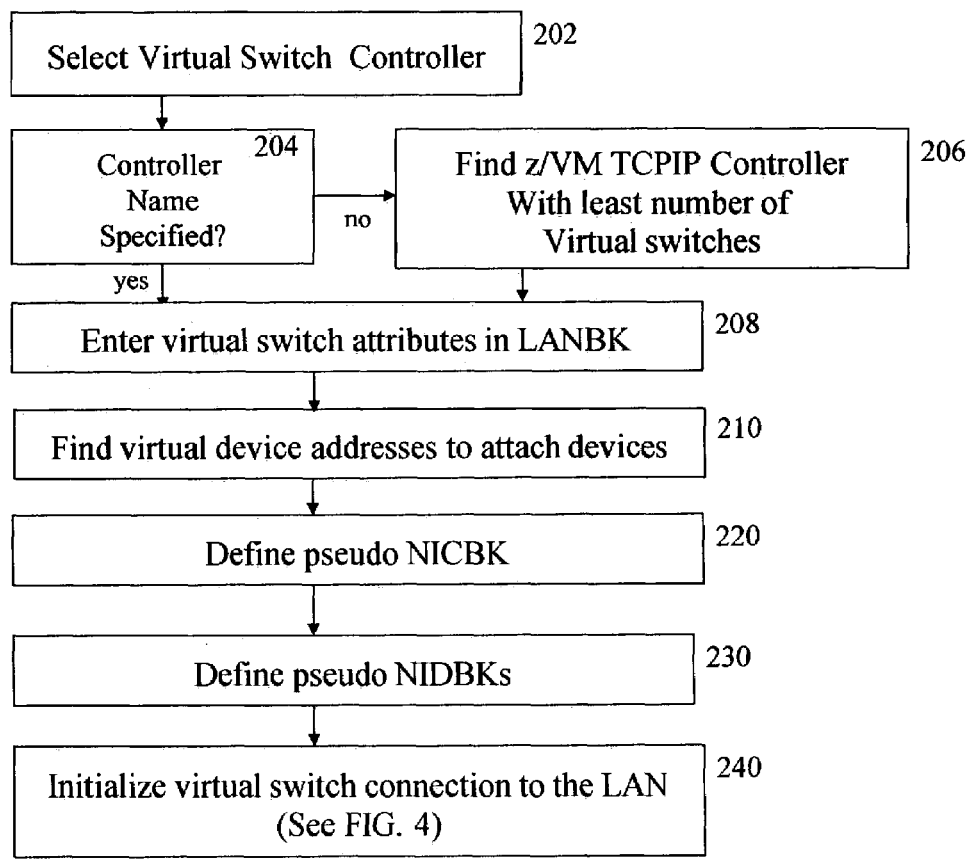
FIG. 3 is a flow chart illustrating a process implemented by the virtual machine operating system of FIG. 1 to select a virtual switch controller and begin initialization of the virtual switch.
Figure 4:
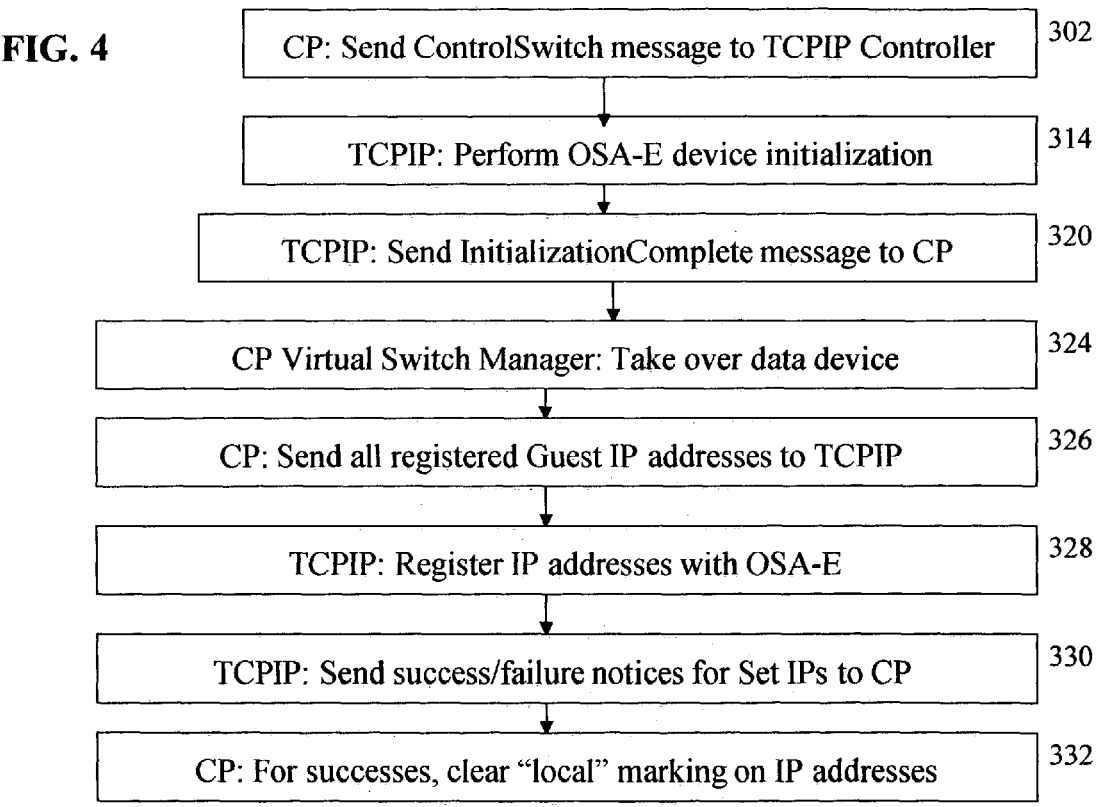
FIG. 4 is a flow chart illustrating a process implemented by the virtual machine operating system of FIG. 1 for the Switch Controller defined in FIG. 3 to complete initialization of the virtual switch.

As illustrated in FIG. 3, the virtual switch manager 301 performs the Select Controller function 85 within the base portion 20 to select a virtual switch controller (step 202). If a controller name was not specified (decision 204), the set of eligible controllers are searched for the one controlling the fewest virtual switches (step 206). If a controller name was specified, it is used for the virtual switch. In either case, the associated virtual switch attributes are then written to the respective LANBK (step 208). Next, the virtual switch manager 301 determines which virtual device addresses to use to attach the device address of the tangible adapter 500 (step 210) to the virtual switch controller 36. In the z/VM operating system, devices are attached to a virtual machine with a virtual device address. In the present invention, the administrator can define the range of virtual devices to be used or let the virtual switch manager 301 choose available virtual device addresses. Next, the virtual switch manager 301 in the base portion creates a pseudo virtual NIC 46 to represent a read control device, a write control device, and a data device for the requested communications (step 220). The pseudo virtual NIC 46 is created is the same manner as virtual NICs 42 and 44 except that it is owned by the base portion, not a virtual machine. The pseudo NIC 46 is composed of a NICBK and a NIDBK for each I/O device. Next, a virtual NIDBK is created by the base portion to represent an I/O device for the network functions as described above (step 230). The pseudo NICBK and pseudo NIDBKs represent the connection between the virtual switch's LAN segment and the tangible adapter.

Next, the virtual switch manager 301 in base portion 20 tells the selected z/VM TCP/IP virtual switch controller 36 to begin the process to initialize a connection between the virtual switch 300 and the tangible adapter card 500 (step 240). This initialization is further illustrated in FIG. 4. The initialization of the virtual switch connection to the tangible adapter card consists of a series of steps between virtual switch manager 301 and the controller 36. The first step is for the virtual switch manager 301 to send a ControlSwitch message to the switch controller 36 (step 302). This is done asynchronously. In response, the controller 36 will initialize read, write, and data devices and enable assists (steps 314) to initialize the tangible adapter card 500. When initialization is complete, the controller 36 sends a message to the virtual switch manager 301 indicating InitializationComplete (step 320). Next, the virtual switch manager 301 takes control of the data device for adapter card 500 (step 324).

Next, the virtual switch manager 301 configures the network characteristics for the adapter card by sending the registered guest IP addresses to the TCP/IP virtual switch controller 36 (step 326). The switch controller 36 then registers IP destination addresses to be associated with the adapter card by passing the network characteristics to the adapter card (in the same manner as is done for a device managed by TCP/IP for z/VM V4R3) (step 328). The responses from the tangible adapter card 500 are then returned to the virtual switch manager 301 (step 330), and the status is recorded in the LAN IP table 69 (step 332). If the IP destination addresses were able to be set with the tangible adapter card 500, the "local only" indication for the addresses in the LAN IP table are cleared (step 332). The systems administrator (or other user) can issue a CP QUERY VSWITCH to learn which virtual NICs are connected to the virtual switch and which IP addresses are associated with each virtual NIC.

Figure 5:
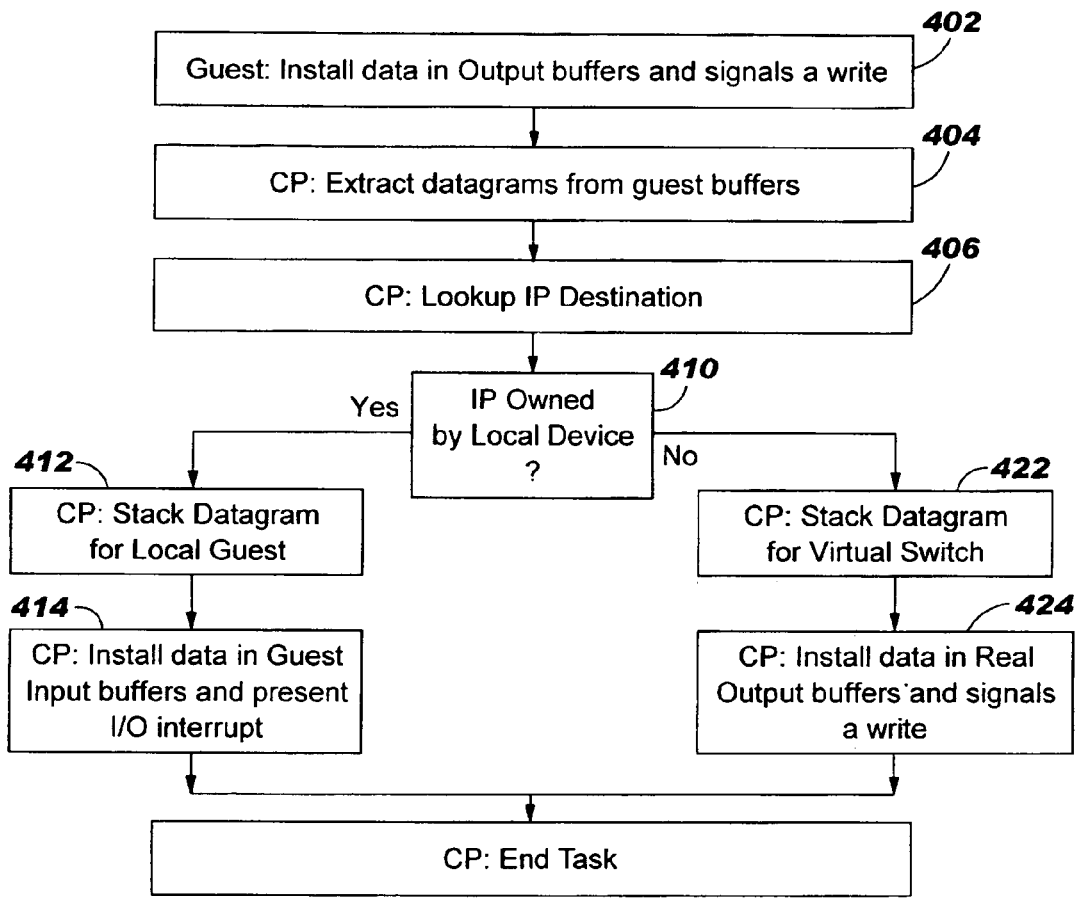
FIG. 5 is a flow chart illustrating a process implemented by the virtual machine operating system of FIG. 1 to transmit data initiated by a local user virtual machine using the virtual switch to the tangible LAN or to a different local user virtual machine.

After the virtual switch 300 and virtual NICs 42 and 44 are defined, coupled and initialized for a virtual switch instance, and the controller 36 has established a connection to the tangible adapter card 500, IP communications can commence between applications 32 and 34 on user virtual machines 12 and 14 and entities on the external LAN 550. FIG. 5 illustrates how an application residing in a user virtual machine 12 or 14 with a connection to the virtual switch 300 can communicate either to an application residing in the other virtual machine, or via a tangible LAN to an application residing in a different tangible computer system. Application 32 constructs an IP datagram which includes (as part of the IP standard) data and an IP destination address of the intended recipient. Then, application 32 writes the IP datagram into storage allocated to virtual machine 12, and places a message in stack 52 indicating a write operation (step 402). The message also includes a pointer to the IP datagram. The stack notifies the device driver 62 of the requested write operation, the destination IP address and the virtual NIC to use for this destination (step 402). Then, the stack copies the pointer for the IP datagram to output buffer 92 for the device driver 62 (step 402). The stack also signals a write operation to the device driver 62 for the virtual NIC 42 (step 402). In response, data device 82 (in virtual NIC 42 of the common base portion 20) extracts the IP datagram from output buffer 92 (of virtual machine 12) (step 404). Virtual NIC manager 303 uses the IP destination address to find the associated NIC in LAN IP Table 69 (step 406). If the IP destination belongs to a virtual NIC connected to the virtual switch 300 (for example, virtual NIC 44) (decision 410), the virtual switch 300 stacks this IP datagram for delivery to the data interface of virtual NIC 44 (step 412). Data device 84 writes the IP datagram into the virtual machine 14 input buffer 95 and creates an appropriate I/O interrupt to signal the virtual machine 14 that data is available for application 34 (step 414). Referring again to decision 410, if the IP destination does not belong to a virtual NIC connected to the virtual switch 300, the virtual switch manager 301 stacks the IP datagram (i.e. creates in common base portion storage a data structure comprised of a pointer for the IP datagram, the length of the IP datagram and other attributes of the IP datagram) for transmission to the tangible external LAN (step 422). Then, virtual switch manager 301, (which also manages the data device for tangible adapter card 500), writes the pointer for the IP datagram into output buffer 57 for the tangible adapter card 500. Then, the virtual switch manager signals a "write" operation to the tangible adapter card 500 (step 424). The adapter card 500 is then responsible for sending the IP datagram to external host 600.

Figure 6:
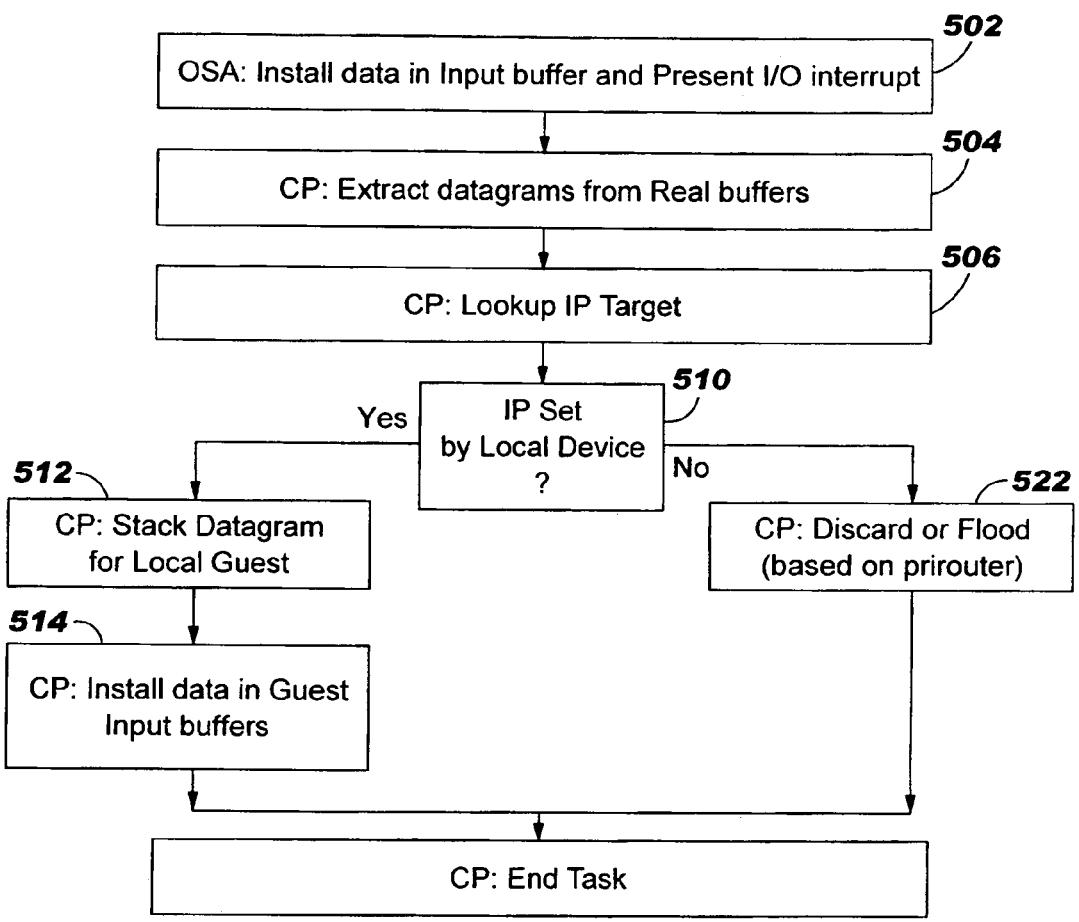
FIG. 6 is a flow chart illustrating a process implemented by the virtual machine operating system of FIG. 1 to receive data over the virtual switch from an application residing on a tangible LAN.

FIG. 6 illustrates how an application residing in an external host 600 connected to a z/VM operating system by a tangible external LAN 550 and adapter card 500 communicates with an application residing in a user virtual machine with a connection to the virtual switch 300. An application residing in external host 600 constructs an IP datagram which includes the IP destination address of the intended recipient (for example, the IP address of application 32). The IP datagram is transmitted over the tangible external LAN 550 to reach the tangible adapter card 500 using conventional, tangible networking hardware and software. The adapter card 500 writes the IP datagram into input buffer 59 (in the common base portion). Adapter card 500 also creates an I/O interrupt to signal virtual switch manager 301 that data is available for the virtual switch 300 (step 502). Virtual switch manager 301 (which manages data transfer for the tangible adapter card 500), extracts the IP datagram from the input buffer 59 (step 504). Virtual switch manager 301 uses the IP destination address to find the associated virtual NIC in LAN IP Table 69 (step 506). If the IP destination belongs to a virtual NIC connected to the virtual switch 300 (for example, virtual NIC 42) (decision 510), virtual switch 300 stacks this IP datagram for delivery to the data interface of virtual NIC 42 (step 512). Data device 82 writes the IP datagram into the guest input buffer 93 and creates an appropriate I/O interrupt to signal the virtual machine 12 that data is available for application 32 (step 514). Referring again to decision 510, if the IP destination does not belong to a virtual NIC connected to the virtual switch 300, the IP datagram is discarded in the default implementation of the virtual switch 300 (step 522).

Based on the foregoing, a virtual machine operating system switch according to the present invention has been disclosed. However, numerous modifications and substitutions can be made without deviating from the scope of the present invention. For example, predefined configuration files can be used instead of dynamic commands to define the virtual switch and virtual NICs. Also, addressing schemes other than NIDBK can be used within common base portion 20 to address the virtual NICs. Therefore, the present invention has been disclosed by way of illustration and not limitation, and reference should be made to the following claims to determine the scope of the present invention.

The invention claimed is:

1. A method for communicating from a first virtual machine to an external device, said method comprising the steps of:
a base portion of a virtual machine operating system forming said first virtual machine and other virtual machines by respective allocations from a CPU, storage and other real resources of a real computer, said base portion controlling all of said virtual machines and providing communication pathways for communications from said first virtual machine to said other virtual machines and to a tangible network adapter card coupled to an external network leading toward said external device;
said first virtual machine writing an IP datagram to an output buffer within storage allocated to said first virtual machine, said IP datagram comprising data and a destination IP address associated with said external device; and
said base portion copying said IP datagram from said output buffer into storage allocated to said base portion such that said IP datagram passes from said first virtual machine into said storage of said base portion without passing through any other virtual machine, said base portion identifying said destination IP address from said IP datagram and determining from a list of IP addresses for said other virtual machines in said real computer that said destination IP address does not correspond to any of said other virtual machines in said real computer and in response, said base portion forwarding said IP datagram, addressed to said destination IP address, to said tangible network adapter card; and
said tangible network adapter card sending said IP datagram to said destination IP address via said external network.

2. A method as set forth in claim 1 wherein the steps of forming said first virtual machine and other virtual machines from said CPU, storage and other real resources of a real computer, and providing communication pathways between said first virtual machine and said other virtual machines and to said tangible network adapter card coupled to said external network leading to said external device, are performed by a single instance of said base portion.

3. A method as set forth in claim 1 further comprising the steps of:
said first virtual machine writing a second IP datagram to a second output buffer within said storage allocated to said first virtual machine, said second IP datagram comprising second data and a second destination IP address of a second one of said virtual machines; and
said base portion copying said second IP datagram from said second output buffer into storage allocated to said base portion such that said second IP datagram passes from said first virtual machine into said base portion storage without passing through any other virtual machines, said base portion identifying said second destination IP address from said second IP datagram and determining from said list of destination IP addresses for said other virtual machines in said real computer that said second destination IP address is an IP address of said second virtual machine, and in response, said base portion copying said second IP datagram into an input buffer within storage allocated to said second virtual machine without said second IP datagram leaving said real computer.

4. A method as set forth in claim 3 wherein:
there are respective virtual network interface cards in said base portion for said other virtual machines, said virtual network interface cards having respective IP addresses; and
said list of IP addresses for said other virtual machines in said real computer resides in said base portion and is a list of IP addresses for said virtual network interface cards; and
the step of copying said second IP datagram into an input buffer within storage allocated to said second virtual machine comprises the step of said virtual network interface card for said second virtual machine copying said second IP datagram into said input buffer within storage allocated to said second virtual machine.

5. A method as set forth in claim 3 wherein there is no translation of said second destination IP address in said second IP datagram as written by said first virtual machine to said output buffer within said storage allocated to said first virtual machine before the step of copying said second IP datagram to said input buffer within storage allocated to said second virtual machine.

6. A method as set forth in claim 1 further comprising the steps of:
an application program executing in said first virtual machine and forming a request to the external device, said request including request data and said destination IP address associated with said external device; and wherein said IP datagram written by said first virtual machine to said output buffer in storage allocated to said first virtual machine includes said request data and said destination IP address.

7. A method as set forth in claim 1 further comprising the steps of:

a second one of said virtual machines writing a second IP datagram to a second output buffer in storage allocated to said second virtual machine, said second IP datagram comprising second data and a second destination IP address associated with a second external device;

said base portion reading said second IP datagram from said second output buffer, copying said second IP datagram from said second output buffer into storage allocated to said base portion such that said second IP datagram passes from said second virtual machine into said storage of said base portion without passing through any other virtual machine, said base portion identifying said second destination IP address from said second IP datagram and determining from said list of IP addresses for said other virtual machines in said real computer that said second destination IP address does not correspond to any of said other virtual machines in said real computer and in response, said base portion forwarding said second IP datagram, addressed to said second destination IP address, to said tangible network adapter card; and said tangible network adapter card sending said second IP datagram to said second destination IP address via said external network.

8. A method as set forth in claim 7 wherein there is a single instance of programming within said base portion which performs the reading, copying, identifying, determining and forwarding steps for both said first IP datagram and said second IP datagram.

9. A method as set forth in claim 1 wherein there is no translation of said destination IP address in said IP datagram as written by first said virtual machine to said output buffer within said storage allocated to said first virtual machine before the step of copying datagram to said tangible network adapter card.

10. A system for communicating from a first virtual machine to an external device, said system comprising:

a CPU, storage and other real resources of a real computer; and base portion means for forming said first virtual machine and other virtual machines by respective allocations from said CPU, storage and other real resources of said real computer; and wherein said base portion means controls all of said virtual machines and provides communication pathways for communications from said first virtual machine to said other virtual machines and to a tangible network adapter card coupled to an external network leading toward said external device;

said first virtual machine includes means for writing an IP datagram to an output buffer within storage allocated to said first virtual machine, said IP datagram comprising data and a destination IP address associated with said external device; and said base portion means includes means for copying said IP datagram from said output buffer into storage allocated to said base portion such that said IP datagram passes from said first virtual machine into said storage of said base portion storage without passing through any other virtual machine, identifying said destination IP address from said IP datagram and determining from a list of IP address for said other virtual machines that said destination IP address does not correspond to any of said other virtual machines and in response, forwarding said IP datagram, addressed to said destination IP address, to said tangible network adapter card, and said tangible network adapter card sending said IP datagram to said IP destination address via said external network.

11. A system as set forth in claim 10 wherein the means for forming said first virtual machine and other virtual machines from said CPU, storage and other real, computer resources and providing communication pathways between said first virtual machine and said other virtual machines and to a tangible network adapter card coupled to an external network leading toward said external device, are performed by a single instance of programming within said base portion means.

12. A system as set forth in claim 10 wherein:

said first virtual machine includes means for writing a second IP datagram to said output buffer within storage allocated to said first virtual machine, said second IP datagram comprising second data and a second destination IP address of a second one of said virtual machines; and said base portion means including means for copying said second IP datagram from said output buffer into said storage allocated to said base portion means such that said second IP datagram passes from said first virtual machine into said storage of said base portion means without passing through any other virtual machines, said base portion means identifying said second destination on IP address from said second IP datagram and determining from said list of said destination IP address for said other virtual machines that said second destination IP address corresponds to said second virtual machine and in response, copying said second IP datagram into an input buffer within storage allocated to said second virtual machine without said second IP datagram leaving said real computer.

13. A system as set forth in claim 12 wherein there is no translation of said second destination IP address in said second IP datagram as written by said first virtual machine to said output buffer within said storage allocated to said first virtual machine before the copying of said second IP datagram to said input buffer within storage allocated to said second virtual machine.

14. A system as set forth in claim 10 further comprising:

a second one of said virtual machines including means for writing a second IP datagram to a second output buffer in storage allocated to said second virtual machine, said second IP datagram comprising second data and a second destination IP address associated with a second external device;

said base portion means including means for reading said second IP datagram from said second output buffer, copying said second IP datagram from said second output buffer into storage allocated to said base portion means such that said second IP datagram passes from said second virtual machine into said storage of said base portion means without passing through any other virtual machine, said base portion means including means for identifyng said second destination IP address from said second IP datagram and determining from said list of IP addresses for said other virtual machines in said real computer that said second destination IP address does not correspond to any of the other virtual machines, and in response, forwarding said second IP datagram, addressed to said second destination IP address, to said tangible network adapter card; and said tangible network adapter card sending said second IP datagram to said second destination IP address via said external network.

15. A system as set forth in claim 14 wherein there is a single instance of programming within said base portion means which performs the reading, copying, identifying, determining and forwarding for both said first IP datagram and said second IP datagram.

16. A system as set forth in claim 10 wherein:
said base portion means includes respective virtual network interface cards for said other virtual machines, said virtual network interface cards have respective IP addresses; and
said list of IP addresses for said other virtual machines in said real computer resides in said base portion and is a list of IP addresses for said virtual network interface cards; and
said means for copying said second IP datagram into an input buffer within storage allocated to said second virtual machine comprises means within said virtual network interface card for said second virtual machine copying said second IP datagram into said input buffer within storage allocated to said second virtual machine.

17. A system as set forth in claim 10 wherein there is no translation of said destination IP address in said IP datagram as written by said first virtual machine to said output buffer within said storage allocated to said first virtual machine before the forwarding of said IP datagram to said tangible network adapter card.

18. A computer program product for communicating from a first virtual machine to an external device, said computer program product comprising:
a computer readable media;
base portion program instructions to form said first virtual machine and other virtual machines by respective allocations from a CPU, storage and other real resources of a real computer; and wherein
said base portion program instructions define a base portion which controls all of said virtual machines and provides communication pathways for communications from said first virtual machine to said other virtual machines and to a tangible network adapter card coupled to an external network leading toward said external device;
in response to said first virtual machine writing an IP datagram to an output buffer in storage allocated to said first virtual machine, said IP datagram comprising data and a destination IP address associated with said external device, said base portion program instructions copy said IP datagram from said output buffer into storage allocated to said base portion such that said IP datagram passes from said first virtual machine into said storage of said base portion without passing through any other virtual machine, said base portion program instructions identify said destination IP address from said IP datagram and determine from a list of IP addresses for said other virtual machines in said real computer that said destination IP address does not correspond to any of said other virtual machines, and in response, forward said IP datagram, addressed to said destination IP address, to said tangible network adapter card; and wherein said base portion program instructions are stored on said media.

19. A computer program product as set forth in claim 18 wherein the base portion program instructions which form said first virtual machine and other virtual machines from said CPU, storage and other real resources of said real computer and provide communication pathways from said first virtual machine to said other virtual machines and to said tangible network adapter card coupled to said external network leading toward said external device consist of a single instance of program instructions.

20. A computer program product as set forth in claim 18 wherein:
said first virtual machine writes a second IP datagram to said output buffer within storage allocated to said first virtual machine, said second IP datagram comprising second data and a second destination IP address of a second one of said virtual machines; and
said base portion program instructions copy said second IP datagram from said output buffer into said storage allocated to said base portion such that said second IP datagram passes from said first virtual machine into said storage of said base portion without passing through any other virtual machines, and identify said second destination IP address from said second IP datagram and determine from said list of destination IP addresses for said other virtual machines in said real computer that said second destination IP address is an IP address of said second virtual machine, and in response, copy said second IP datagram into an input buffer of storage allocated to said second virtual machine without said second IP datagram leaving said real computer.

21. A computer program product as set forth in claim 20 wherein there is no translation of said second destination IP address in said second IP datagram as written by said first virtual machine to said output buffer within said storage allocated to said first virtual machine before the copying of said second IP datagram to said input buffer within storage allocated to said second virtual machine.

22. A computer program product as set forth in claim 18 wherein:
a second one of said virtual machines writing a second IP datagram to a second output buffer within storage allocated to said second virtual machine, said second IP datagram comprising second data and a second destination IP address associated with a second external device; and
said base portion program instructions read said second IP datagram from said second output buffer, copy said second IP datagram from said second output buffer into storage allocated to said base portion such that said second IP datagram passes from said second virtual machine into said storage of said base portion without passing through any other virtual machine, said base portion program instructions identify said second destination IP address from said second IP datagram and determine from said list of IP addresses for said other virtual machines that said second destination IP address does not correspond to any of the other virtual machines in said real computer and in response, forward said second IP datagram, addressed to said second destination IP address, to said tangible network adapter card.

23. A computer program product as set forth in claim 22 wherein there is a single instance of programming within said base portion program instructions which performs the reading, copying, identifying, determining and forwarding for both said first IP datagram and said second IP datagram.

24. A computer program product as set forth in claim 18 wherein:
said base portion program instructions form respective virtual network interface cards for said other virtual machines, said virtual network interface cards have respective IP addresses; and
said list of IP addresses for said other virtual machines in said real computer resides in said base portion and is a list of IP addresses for said virtual network interface cards; and
said base program instructions to copy said second IP datagram into an input buffer within storage allocated to said second virtual machine comprises program instructions for said virtual network interface card for said second virtual machine to copy said second IP datagram into said input buffer within storage allocated to said second virtual machine.

25. A computer program product as set forth in claim 18 wherein there is no translation of said destination IP address in said IP datagram as written by said first virtual machine to said output buffer within said storage allocated to said first virtual machine before the forwarding of said IP datagram to said tangible network adapter card.

* * * * *